(12) United States Patent
Lee et al.

(10) Patent No.: US 8,666,323 B2
(45) Date of Patent: *Mar. 4, 2014

(54) RFID READER AND METHOD FOR SUPPRESSING TRANSMISSION LEAKAGE SIGNAL THEREOF

(75) Inventors: Donghan Lee, Daejeon (KR); Sang Gee Kang, Daejeon (KR); Kwang-Soo Cho, Daejeon (KR); Man Sik Park, Daejeon (KR); Chan-Won Park, Daejeon (KR); Cheng-Hao Quan, Daejeon (KR); Ji-Hoon Bae, Daejeon (KR); Gil Young Choi, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 714 days.

This patent is subject to a terminal disclaimer.

(21) Appl. No.: 12/786,777

(22) Filed: May 25, 2010

(65) Prior Publication Data

US 2011/0136445 A1 Jun. 9, 2011

(30) Foreign Application Priority Data

Dec. 7, 2009 (KR) .......................... 10-2009-0120461

(51) Int. Cl.
*H04B 17/00* (2006.01)

(52) U.S. Cl.
USPC ............... 455/67.14; 455/67.11; 455/67.13; 455/67.16; 455/114.2; 455/115.1; 455/115.2; 455/115.3; 455/126; 455/226.1; 455/226.2; 455/226.3; 455/296; 375/285; 375/278; 375/346; 375/371; 340/10.1; 340/10.3; 340/10.4; 340/572.1

(58) Field of Classification Search
USPC ............... 455/67.11, 67.13, 67.14, 67.16, 70, 455/570, 114.2, 114.3, 115.1, 115.2, 115.3, 455/126, 226.1, 226.2, 226.3, 226.4, 296; 340/10.1, 10.3, 10.4, 572.1; 375/285, 375/278, 346, 371

See application file for complete search history.

(56) References Cited

U.S. PATENT DOCUMENTS

| 7,671,720 | B1 * | 3/2010 | Martin et al. ................. 340/10.1 |
| 8,000,674 | B2 * | 8/2011 | Sajid et al. ..................... 455/296 |
| 8,054,161 | B2 * | 11/2011 | Lee et al. ...................... 340/10.1 |
| 2006/0098765 | A1 | 5/2006 | Thomas et al. |
| 2008/0009258 | A1 * | 1/2008 | Safarian et al. ............... 455/307 |
| 2009/0058604 | A1 * | 3/2009 | Jung et al. .................... 340/10.1 |
| 2010/0026460 | A1 * | 2/2010 | Lee et al. ...................... 340/10.1 |

FOREIGN PATENT DOCUMENTS

| JP | 2004-535700 T | 11/2004 |
| KR | 10-0812278 B1 | 3/2008 |
| KR | 1020080112669 A | 12/2008 |
| KR | 10-0954059 B1 | 4/2010 |

* cited by examiner

Primary Examiner — Junpeng Chen
(74) Attorney, Agent, or Firm — Ladas & Parry LLP

(57) ABSTRACT

Provided are an RFID reader and a method for suppressing transmission leakage signals thereof. The RFID reader includes a first loop, a second loop, and a digital signal processor. The first loop suppresses a first transmission leakage signal of an RX signal in response to a first leakage control signal. The second loop suppresses a second transmission leakage signal of the RX signal, received through the first loop, in response to a second leakage control signal. The digital signal processor generates the first leakage control signal and the second leakage control signal. The digital signal processor generates the first leakage control signal until the level of the first transmission leakage signal becomes equal to or lower than the level of a first reference transmission leakage signal.

21 Claims, 5 Drawing Sheets

RFID READER AND METHOD FOR SUPPRESSING TRANSMISSION LEAKAGE SIGNAL THEREOF

CROSS-REFERENCE TO RELATED APPLICATIONS

This U.S. non-provisional patent application claims priority under 35 U.S.C. §119 of Korean Patent Application No. 10-2009-0120461, filed on Dec. 7, 2009, the entire contents of which are hereby incorporated by reference.

BACKGROUND OF THE INVENTION

The present invention disclosed herein relates to a Radio Frequency IDentification (RFID) system, and more particularly, to an RFID reader and a method for suppressing transmission leakage signals thereof.

Radio Frequency IDentification (RFID) is a technology that uses radio waves to identify information. An RFID system includes an RFID tag and an RFID reader.

In general, an RFID reader uses one or two antennas to transmit/receive signals.

An RFID reader using one antenna divides a transmit (TX) signal and a receive (RX) signal by a directional coupler. The directional coupler transfers a TX signal, received from a transmitting unit, to the antenna and prevents the TX signal from being transferred to a receiving unit. Also, the directional coupler transfers an RX signal, received from the antenna, to the receiving unit and prevents the RX signal from being transferred to the transmitting unit. However, in general, the TX/RX isolation of the directional coupler is not high. Thus, the TX signal leaks through the directional coupler toward the receiving unit (i.e., an internal leakage signal). Also, a portion of the TX signal transferred to the antenna is reflected toward the directional coupler. The reflected signal (i.e., an external leakage signal) is transferred through the directional coupler to the receiving unit, despite being a signal received from the antenna.

In the case of an RFID reader using two antennas, a TX signal outputted from the TX antenna is transferred through the RX antenna to a receiving unit. As the size of the RFID reader decreases, a leakage signal (i.e., an internal leakage signal) transferred to the receiving unit increases because the distance between the TX/RX antennas decreases. Also, in the case of the RFID reader using two antennas, a portion of the signal transferred to the antenna is reflected toward the RX unit. The reflected signal (i.e., an external leakage signal) is transferred through a directional coupler to the receiving unit, despite being a signal received from the TX antenna.

SUMMARY OF THE INVENTION

Embodiments of the present invention provide an RFID reader, which suppresses transmission leakage signals formed through two (external/internal) different paths, and a method for suppressing transmission leakage signals thereof.

Embodiments of the present invention also provide an RFID reader, which suppresses transmission leakage signals to increase the TX/RX isolation, and a method for suppressing transmission leakage signals thereof.

Embodiments of the present invention also provide an RFID reader, which increases the TX/RX isolation to increase the identification distance and the identification rate of an RFID system, and a method for suppressing transmission leakage signals thereof.

In some embodiments of the present invention, RFID readers include: a first loop suppressing a first transmission leakage signal of an RX signal in response to a first leakage control signal; a second loop suppressing a second transmission leakage signal of the RX signal, received through the first loop, in response to a second leakage control signal; and a digital signal processor generating the first leakage control signal and the second leakage control signal, wherein the digital signal processor generates the first leakage control signal until the level of the first transmission leakage signal becomes equal to or lower than the level of a first reference transmission leakage signal.

In some embodiments, if the level of the first transmission leakage signal is equal to or lower than the level of the first reference transmission leakage signal, the digital signal processor generates the second leakage control signal until the level of the second transmission leakage signal becomes equal to or lower than the level of a second reference transmission leakage signal.

In other embodiments, if the first loop suppresses an internal transmission leakage signal, the second loop suppresses an external transmission leakage signal.

In further embodiments, if the first loop suppresses an external transmission leakage signal, the second loop suppresses an internal transmission leakage signal.

In still further embodiments, the second loop includes: a first power divider dividing a TX signal to output a first TX signal and a second TX signal; a first amplitude/phase shifter shifting the amplitude/phase of the first TX signal according to the second leakage control signal to generate a first leakage suppression signal; and a first power combiner combining the RX signal, received through the first loop, with the first leakage suppression signal to suppress the first transmission leakage signal.

In still further embodiments, the first loop includes: a second power divider dividing the second TX signal to output a third TX signal and a fourth TX signal; a second amplitude/phase shifter shifting the amplitude/phase of the third TX signal according to the first leakage control signal to generate a second leakage suppression signal; and a second power combiner combining the RX signal with the second leakage suppression signal to suppress the second transmission leakage signal.

In still further embodiments, the digital signal processor sets initial values for generation of the first leakage control signal and the second leakage control signal, and generates the first leakage control signal and the second leakage control signal by means of the set initial values.

In still further embodiments, the digital signal processor detects the first transmission leakage signal and the second transmission leakage signal, generates the first leakage control signal by means of the transmission leakage signal, and generates the second leakage control signal by means of the second transmission leakage signal.

In still further embodiments, the digital signal processor generates the first leakage control signal by determining, iteratively a predetermined number of times, whether the first transmission leakage signal included in the RX signal has a smaller value than the first reference transmission leakage signal.

In still further embodiments, the digital signal processor generates the second leakage control signal by determining, iteratively a predetermined number of times, whether the second transmission leakage signal included in the RX signal has a smaller value than the second reference transmission leakage signal.

In other embodiments of the present invention, methods for suppressing transmission leakage signals of an RFID reader include: dividing a TX signal to generate a first TX signal and a second TX signal; dividing the second TX signal to generate a third TX signal and a fourth TX signal; controlling the amplitude/phase of the third TX signal in response to a first leakage control signal to generate a first leakage suppression signal; combining the first leakage suppression signal with the RX signal to suppress a first transmission leakage signal; controlling the amplitude/phase of the first TX signal in response to a second leakage control signal to generate a second leakage suppression signal; and combining the second leakage suppression signal with the RX signal to suppress a second transmission leakage signal, wherein the first leakage control signal is generated until the level of the first transmission leakage signal becomes equal to or lower than the level of a first reference transmission leakage signal.

In some embodiments, if the level of the first transmission leakage signal is equal to or lower than the level of the first reference transmission leakage signal, the second leakage control signal is generated until the level of the second transmission leakage signal becomes equal to or lower than the level of a second reference transmission leakage signal.

In other embodiments, if the first transmission leakage signal is an internal transmission leakage signal, the second transmission leakage signal is an external transmission leakage signal.

In further embodiments, if the first transmission leakage signal is an external transmission leakage signal, the second transmission leakage signal is an internal transmission leakage signal.

In still further embodiments, the first leakage control signal and the second leakage control signal are generated using predetermined initial values.

In still further embodiments, the first leakage control signal is generated by determining, iteratively a predetermined number of times, whether the first transmission leakage signal included in the RX signal has a smaller value than the first reference transmission leakage signal.

In still further embodiments, the second leakage control signal is generated by determining, iteratively a predetermined number of times, whether the second transmission leakage signal included in the RX signal has a smaller value than the second reference transmission leakage signal.

In still further embodiments, the TX signal is a continuous-wave signal that is transmitted in a period previous to a transmission period of a command of the RFID reader.

In still further embodiments, the first leakage suppression signal is generated by controlling the third TX signal to have the same amplitude as the first transmission leakage signal and controlling the third TX signal to have the opposite phase with respect to the first transmission leakage signal.

In still further embodiments, the second leakage suppression signal is generated by controlling the first TX signal to have the same amplitude as the second transmission leakage signal and controlling the first TX signal to have the opposite phase with respect to the second transmission leakage signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the following descriptions, a detailed description of well-known functions or configurations will be omitted in order not to unnecessarily obscure the subject matters of the present invention.

Embodiments of the present invention provide a Radio Frequency IDentification (RFID) reader that controls transmission leakage signals generated through different paths in an RFID system.

Figure 1:
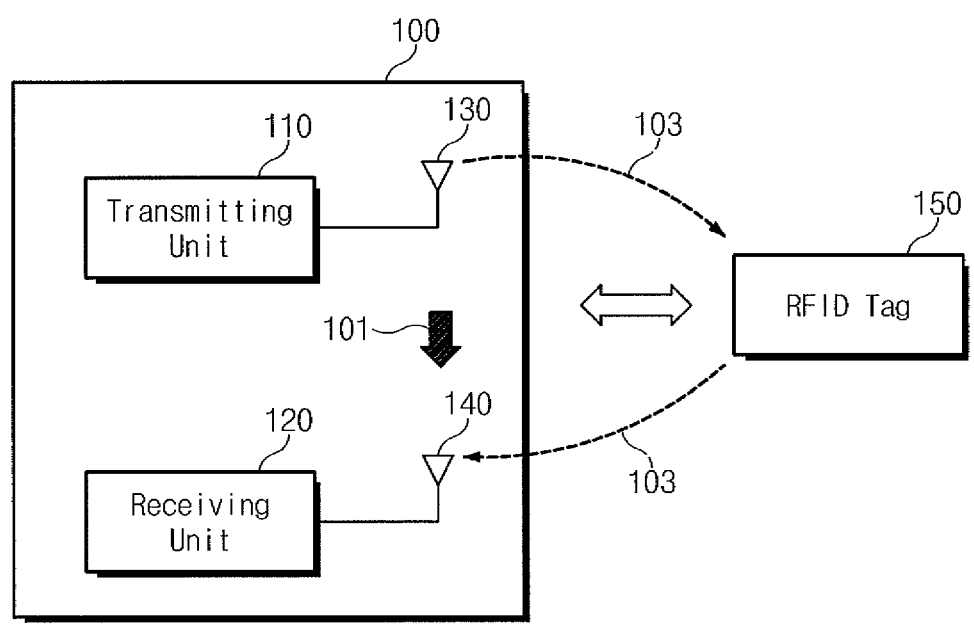
FIG. 1 is a block diagram of an RFID system including an RFID reader with separate TX/RX antennas.

FIG. 1 is a block diagram of an RFID system including an RFID reader with separate transmit/receive (TX/RX) antennas.

Referring to FIG. 1, an RFID system includes an RFID reader 100 and an RFID tag 150. The RFID reader 100 includes a transmitting unit 110, a receiving unit 120, a TX antenna 130, and an RX antenna 140.

The transmitting unit 110 transmits a TX signal to the TX antenna 130. The TX antenna 130 transmits the TX signal to the RFID tag 150.

Upon receiving the TX signal, the RFID tag 150 transmits TX information in response to the received TX signal.

The RX antenna 140 receives the TX information from the RFID tag 150. The receiving unit 120 receives the TX information from the RX antenna 140 and processes the same.

Transmission leakage signals 101 and 103 may be generated in the RFID reader 100 with the separate TX/RX antennas 130 and 140. The first transmission leakage signal 101 may be generated in the RFID reader 100 when the peripheral environment of the TX/RX antennas 130 and 140 is fixed or has little change. The second transmission leakage signal 103 may be generated when the RFID reader 100 identifies the RFID tag 150 attached to various types of objects (e.g., papers, woods, plastics, and metals). That is, the second transmission leakage signal 103 may be generated according to a change in the peripheral environment of the TX/RX antennas 130 and 140.

Figure 2:
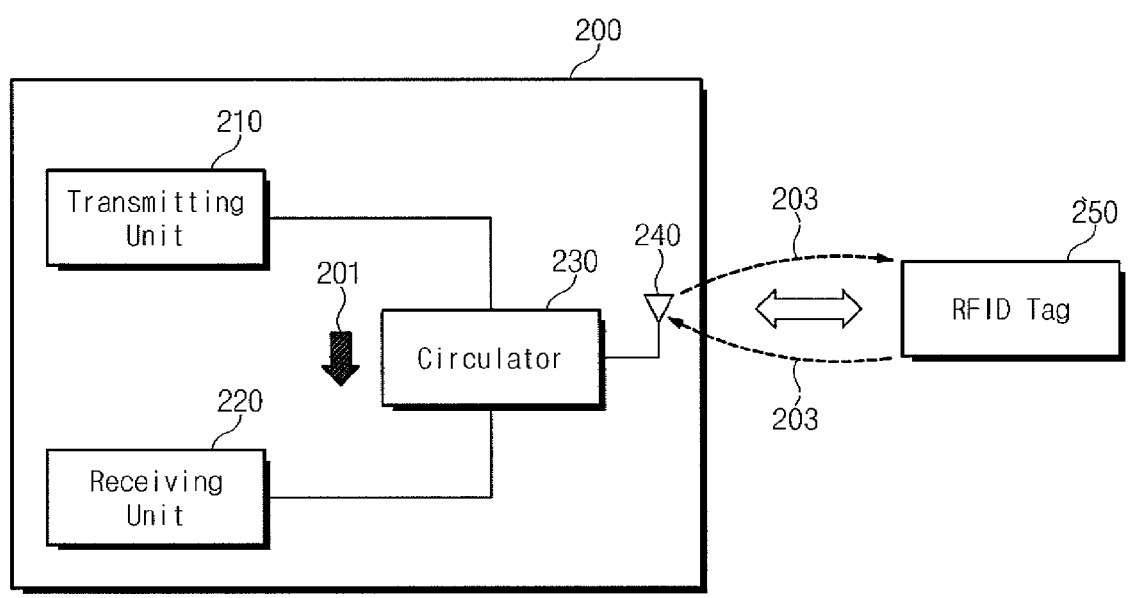
FIG. 2 is a block diagram of an RFID system including an RFID reader with an integrated TX/RX antenna.

FIG. 2 is a block diagram of an RFID system including an RFID reader with an integrated TX/RX antenna.

Referring to FIG. 2, an RFID system includes an RFID reader 200 and an RFID tag 250. The RFID reader 200 includes a transmitting unit 210, a receiving unit 220, a circulator 230, and a TX/RX antenna 240.

The transmitting unit 210 transmits a TX signal to the circulator 230. The circulator 230 transmits the TX signal to the TX/RX antenna 240. Herein, a directional coupler may be used instead of the circulator 230. The TX/RX antenna 240 transmits the TX signal to the RFID tag 250.

Upon receiving the TX signal, the RFID tag 250 transmits TX information in response to the received TX signal.

The TX/RX antenna 240 receives the TX information from the RFID tag 250. The circulator 230 transmits the TX information to the receiving unit 220. The receiving unit 220 receives the TX information from the circulator 230 and processes the same.

Transmission leakage signals 201 and 203 may be generated in the RFID reader 200 with the integrated TX/RX antenna 240. The first transmission leakage signal 201 may be generated in the RFID reader 200 when the peripheral environment of the TX/RX antenna 240 is fixed or has little change. The second transmission leakage signal 203 may be generated when the RFID reader 200 identifies the RFID tag 250 attached to various types of objects (e.g., papers, woods, plastics, and metals). That is, the second transmission leakage signal 203 may be generated according to a change in the peripheral environment of the TX/RX antenna 240.

Hereinafter, a description will be given of the suppression of internal or external transmission leakage signals that are transmitted through two independent paths in an RFID reader with separate TX/RX antennas or in an RFID reader with an integrated TX/RX antenna, as described above.

Figure 3:
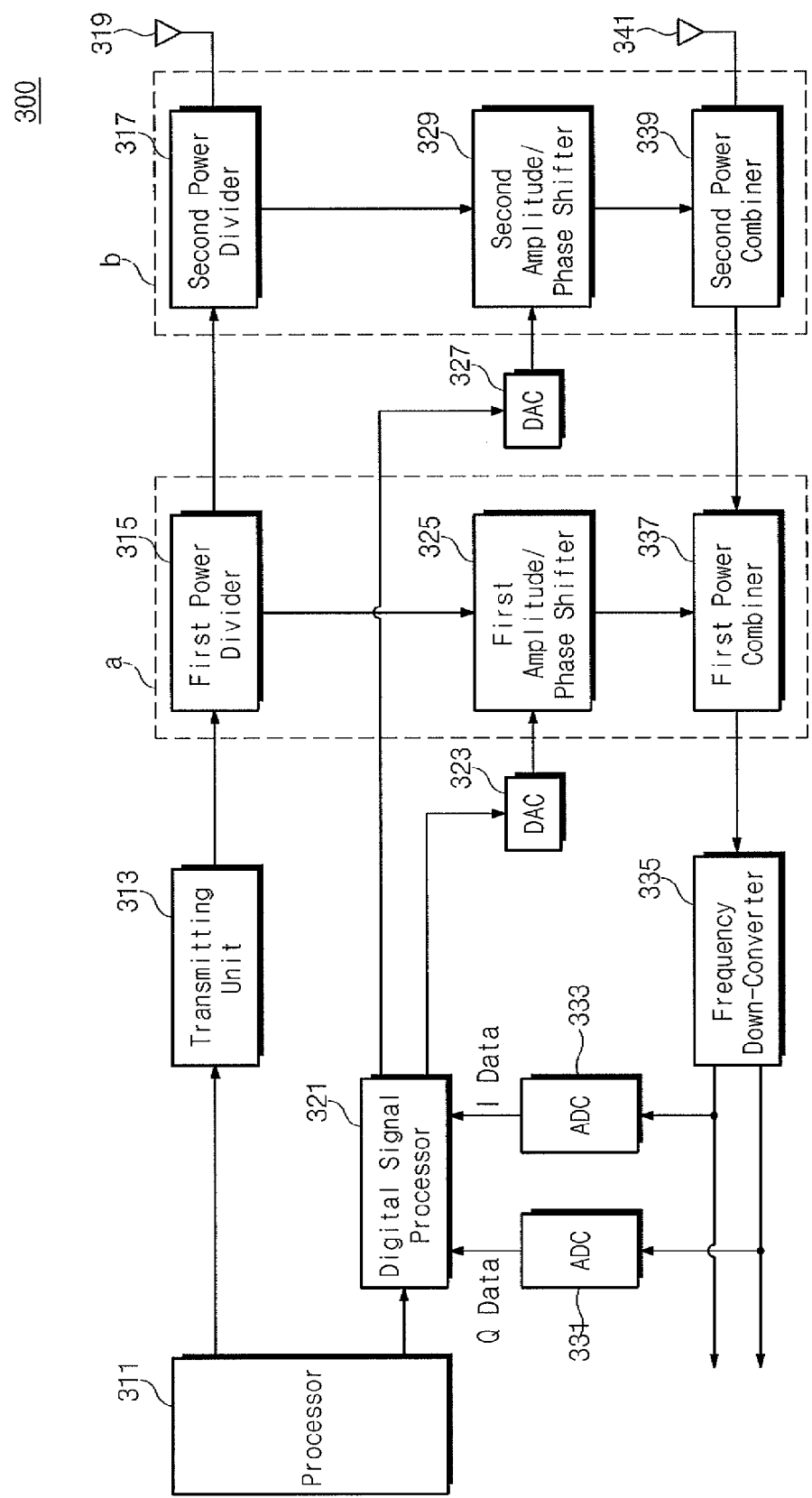
FIG. 3 is a block diagram of an RFID reader suppressing transmission leakage signals according to an exemplary embodiment of the present invention.

FIG. 3 is a block diagram of an RFID reader suppressing transmission leakage signals according to an exemplary embodiment of the present invention.

Referring to FIG. 3, an RFID reader 300 includes a processor 311, a transmitting unit 313, a first power divider 315, a second power divider 317, a TX antenna 319, a digital signal processor 321, a first digital-to-analog converter (DAC) 323, a first amplitude/phase shifter 325, a second DAC 327, a second amplitude/phase shifter 329, a first analog-to-digital converter (ADC) 331, a second ADC 333, a frequency downconverter 335, a first power combiner 337, a second power combiner 339, and an RX antenna 341.

The processor 311 controls the generation of a TX signal by the transmitting unit 313.

The transmitting unit 313 generates a TX signal under the control of the processor 311. For suppression of transmission leakage signals, the TX signal generated by the transmitting unit 313 is a continuous-wave signal. Herein, the TX signal is transmitted in a period previous to a transmission period of a command of the RFID reader.

The first power divider 315 divides the TX signal into a first TX signal and a second TX signal. The first power divider 315 outputs the first TX signal to the first amplitude/phase shifter 325 and outputs the second TX signal to the second power divider 317.

The second power divider 317 divides the second TX signal into a third TX signal and a fourth TX signal. The second power divider 317 outputs the third TX signal to the second amplitude/phase shifter 329 and transmits the fourth TX signal to the TX antenna 319.

For example, when a user requests the suppression of transmission leakage signals, the processor 311 controls the digital signal processor 321 to suppress transmission leakage signals.

Under the control of the processor 311, the digital signal processor 321 generates a first leakage control signal and a second leakage control signal to suppress a first transmission leakage signal and a second transmission leakage signal. Herein, if the first transmission leakage signal is an internal transmission leakage signal, the second transmission leakage signal is an external transmission leakage signal. If the first transmission leakage signal is an external transmission leakage signal, the second transmission leakage signal is an internal transmission leakage signal.

The digital signal processor 321 detects a first transmission leakage signal and a second transmission leakage signal, included in an RX signal, from the first ADC 331 and the second ADC 333. The digital signal processor 321 generates a first leakage control signal and a second leakage control signal to suppress the first transmission leakage signal and the second transmission leakage signal so that the first transmission leakage signal and the second transmission leakage signal become smaller than a predetermined reference transmission leakage signal.

The digital signal processor 321 may use predetermined initial values to generate the first leakage control signal and the second leakage control signal.

Herein, the first leakage control signal is used by the second amplitude/phase shifter 329 to generate a first leakage suppression signal, and the second leakage control signal is used by the first amplitude/phase shifter 325 to generate a second leakage suppression signal.

The digital signal processor 321 may set iteration count values to an initial value (e.g., '0') to iteratively suppress the first transmission leakage signal and the second transmission leakage signal.

The second DAC 327 converts the first leakage control signal, generated by the digital signal processor 321, into an analog signal. If the amplitudes and phases of transmission leakage signals received through independent paths are shifted independently, the second DAC 327 may include a pair of DACs.

In response to the first leakage control signal, the second amplitude/phase shifter 329 shifts the amplitude and phase of the third TX signal to generate the first leakage suppression signal. That is, the second amplitude/phase shifter 329 generates the first leakage suppression signal in response to the first analog leakage control signal. For example, the first leakage suppression signal may have the same amplitude as the third TX signal, and may have a 180° phase difference from the third TX signal (i.e., the opposite phase).

The second power combiner 339 receives an RX signal through the RX antenna 341. Herein, the RX signal includes the first transmission leakage signal and the second transmission leakage signal.

The second power combiner 339 combines the first leakage suppression signal, generated by the second amplitude/phase shifter 329, with the first transmission leakage signal, included in the RX signal, to suppress the first transmission leakage signal.

The first DAC 323 converts the second leakage control signal, generated by the digital signal processor 321, into an analog signal. If the amplitudes and phases of transmission leakage signals received through independent paths are shifted independently, the first DAC 323 may include a pair of DACs.

In response to the second leakage control signal, the first amplitude/phase shifter 325 shifts the amplitude and phase of the first TX signal to generate the second leakage suppression signal. That is, the first amplitude/phase shifter 325 generates the second leakage suppression signal in response to the second analog leakage control signal.

For example, the second leakage suppression signal may have the same amplitude as the first TX signal, and may have a 180° phase difference from the first TX signal (i.e., the opposite phase).

The first power combiner 337 receives an RX signal through the second power combiner 339. Herein, the RX signal includes the second transmission leakage signal.

The first power combiner 337 combines the second leakage suppression signal, generated by the first amplitude/phase shifter 325, with the second transmission leakage signal, included in the RX signal, to suppress the second transmission leakage signal.

The frequency down-converter 335 down-converts an RX signal, outputted from the first power combiner 337, into a baseband signal.

The first ADC 331 converts the down-converted output signal of the first power combiner 337 into a digital baseband signal and outputs the digital baseband signal to the digital signal processor 321. If the frequency down-converter 335 is an IQ demodulator, the first ADC 331 performs digital signal conversion for data of a Q (Q-phase) channel.

The second ADC 333 converts the down-converted output signal of the first power combiner 337 into a digital baseband signal and outputs the digital baseband signal to the digital signal processor 321. If the frequency down-converter 335 is an IQ demodulator, the second ADC 333 performs digital signal conversion for data of an I (I-phase) channel.

The digital signal processor 321 detects the first transmission leakage signal and the second transmission leakage signal, included in the digital RX signal, from the first ADC 331 and the second ADC 333. The digital signal processor 321 compares the detected first transmission leakage signal with a first reference transmission leakage signal to suppress the first transmission leakage signal. The digital signal processor 321 compares the detected second transmission leakage signal with a second reference transmission leakage signal to suppress the second transmission leakage signal. Herein, the first reference transmission leakage signal is an allowable reference value of the first transmission leakage signal, and the second reference transmission leakage signal is an allowable reference value of the second transmission leakage signal.

In this manner, the digital signal processor 321 may generate the first leakage control signal and the second leakage control signal by using the first transmission leakage signal and the second transmission leakage signal detected from the first ADC 331 and the second ADC 333.

If an iteration count is set, the digital signal processor 321 repeats an operation of suppressing the first transmission leakage signal or the second transmission leakage signal, as many times as the iteration count.

The frequency down-converter 335 restores the TX information from the RFID tag by demodulating an RFID tag replay signal, i.e., the RX signal obtained by suppressing the first transmission leakage signal and the second transmission leakage signal in the RX signal received from the RX antenna.

For example, the RFID reader 300 of FIG. 3 may be used as the RFID reader 100 with separate TX/RX antennas illustrated in FIG. 1.

Figure 4:
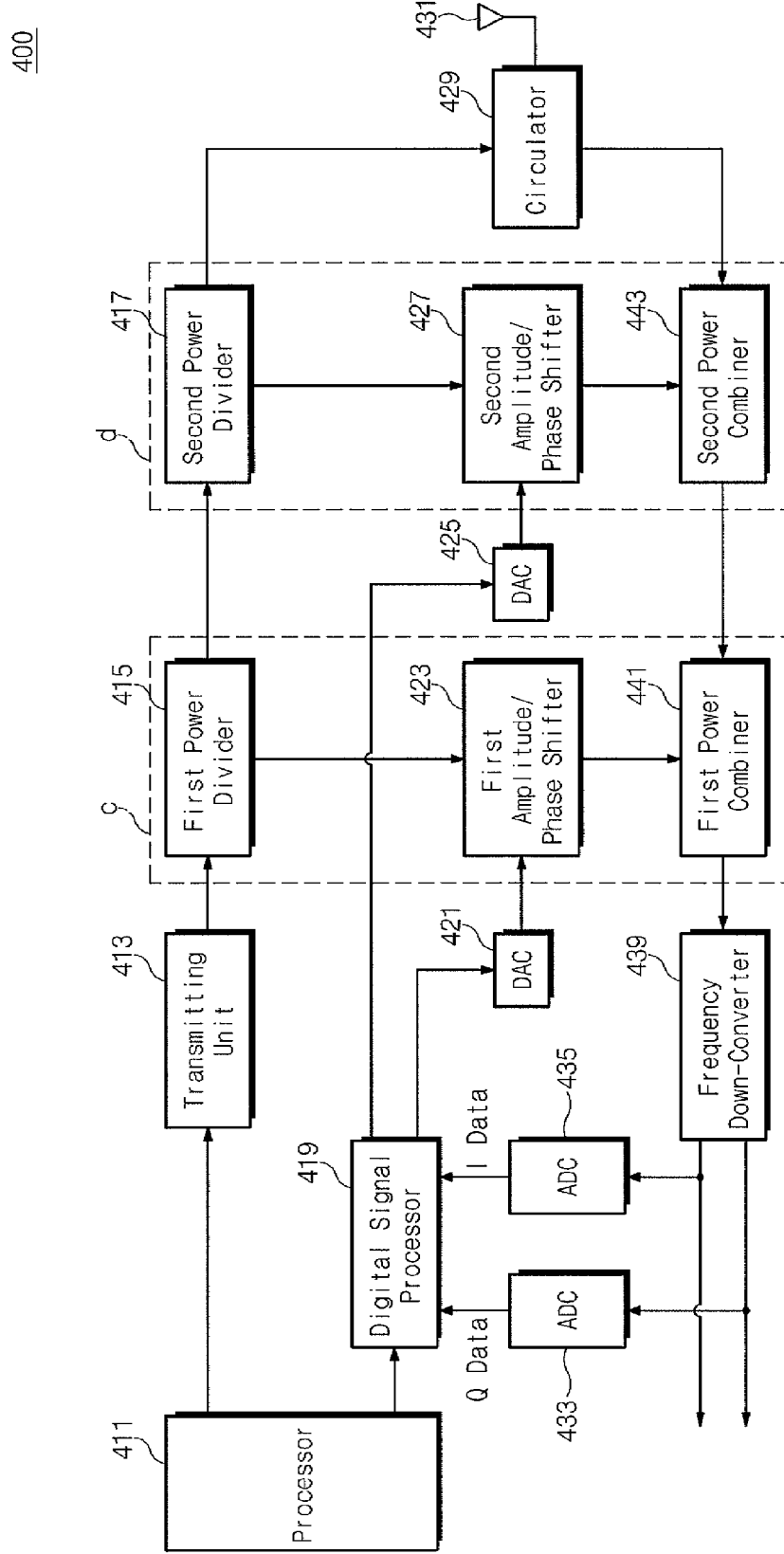
FIG. 4 is a block diagram of an RFID reader suppressing transmission leakage signals according to another exemplary embodiment of the present invention.

FIG. 4 is a block diagram of an RFID reader suppressing transmission leakage signals according to another exemplary embodiment of the present invention.

Referring to FIG. 4, an RFID reader 400 includes a processor 411, a transmitting unit 413, a first power divider 415, a second power divider 417, a digital signal processor 419, a first digital-to-analog converter (DAC) 421, a first amplitude/phase shifter 423, a second DAC 425, a second amplitude/phase shifter 427, a circulator 429, a TX/RX antenna 431, a first analog-to-digital converter (ADC) 433, a second ADC 435, a frequency down-converter 439, a first power combiner 441, and a second power combiner 443.

The RFID reader 400 has the same structure as the RFID reader 300 of FIG. 3 with the exception that the single TX/RX antenna 431 is shared through the circulator 429.

Thus, a detailed description of the same components as in FIG. 3 will be omitted for conciseness.

The second power divider 417 transmits the fourth TX signal to the TX/RX antenna 431 through the circulator 429.

The second power combiner 443 receives an RX signal from the circulator 429. The second power combiner 443 combines the first leakage suppression signal, received from the second amplitude/phase shifter 427, with the first transmission leakage signal, included in the RX signal, to suppress the first transmission leakage signal.

The first power combiner 441 combines the second leakage suppression signal, received from the first amplitude/phase shifter 423, with the second transmission leakage signal, included in the RX signal, to suppress the second transmission leakage signal.

For example, the RFID reader 400 of FIG. 4 may be used as the RFID reader 200 with an integrated TX/RX antenna illustrated in FIG. 2.

Meanwhile, in FIGS. 3 and 4, the RFID reader suppresses the first transmission leakage signal and the second transmission leakage signal through the two respective loops. The first loop a/c includes the first power divider 315/415, the first amplitude/phase shifter 325/423, and the first power combiner 337/441. Likewise, the second loop b/d includes the second power divider 317/417, the second amplitude/phase shifter 329/427, and the second power combiner 339/443. The RFID reader suppresses the second transmission leakage signal through the first loop and suppresses the first transmission leakage signal through the second loop. The first loop a/c suppresses the first transmission leakage signal by the first leakage control signal generated by the digital signal processor 321/419. Likewise, the second loop b/d suppresses the second transmission leakage signal by the second leakage control signal generated by the digital signal processor 321/419.

Figure 5:
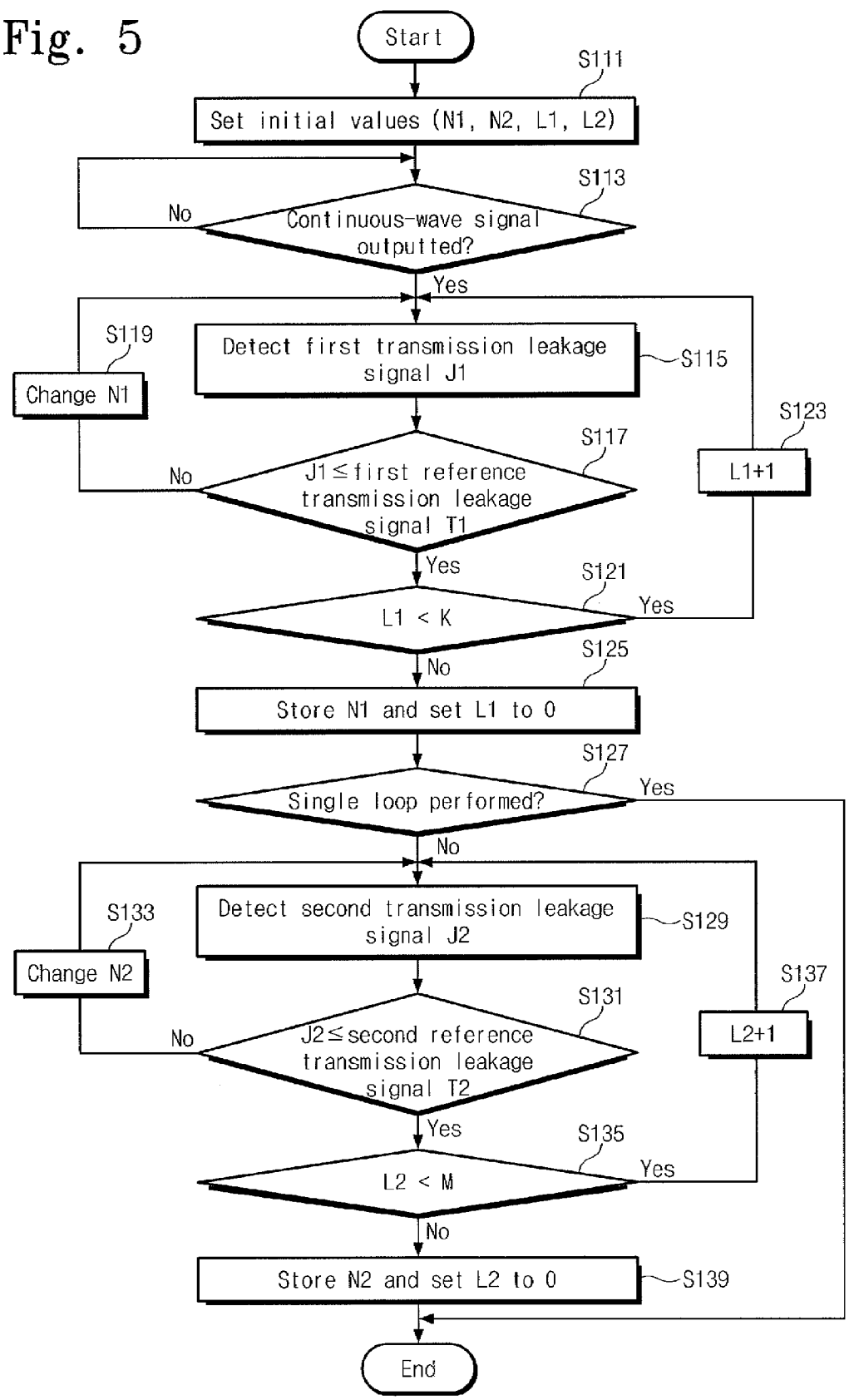
FIG. 5 is a flow chart illustrating a process for suppressing transmission leakage signals of an RFID reader according to an exemplary embodiment of the present invention.

FIG. 5 is a flow chart illustrating a process for suppressing the transmission leakage signals of the RFID reader according to an exemplary embodiment of the present invention.

Referring to FIG. 5, in step S111, the digital signal processor 321 (or 419) of the RFID reader sets initial values under the control of the processor 311. The digital signal processor 321 sets an initial value N1 for generation of a first leakage control signal and an initial value N2 for generation of a second leakage control signal to predetermined initial values, respectively. The initial value N1 for generation of the first leakage control signal is set to a predetermined initial value (e.g., C1), and the initial value N2 for generation of the second leakage control signal is set to a predetermined initial value (e.g., C2). Also, loop iteration counts L1 and L2, for performing iterative loops to secure the reliability of suppression of transmission leakage signals in the respective loops, may be set to an initial value (e.g., '0').

In step S113, the digital signal processor 321 determines whether a continuous-wave signal (i.e., a signal of a waveform without amplitude/strength change) is outputted from the transmitting unit 313. If a continuous-wave signal is not outputted from the transmitting unit 313 (in step S113), the digital signal processor 321 waits for a continuous-wave signal to be outputted from the transmitting unit 313, in step S113. If a continuous-wave signal is outputted from the transmitting unit 313 (in step S113), the digital signal processor 321 proceeds to step S115. Herein, the continuous-wave signal may be a test signal for leakage signal suppression.

In step S115, the digital signal processor 321 detects a first transmission leakage signal J1.

In step S117, the digital signal processor 321 determines whether the level of the first transmission leakage signal J1 is equal to or lower than the level of a first reference transmission leakage signal T1. If the level of the first transmission leakage signal J1 is higher than the level of the first reference transmission leakage signal T1 (in step S117), the digital signal processor 321 proceeds to step S119. In step S119, the digital signal processor 321 changes a first leakage control signal N1. If the level of the first transmission leakage signal J1 is equal to or lower than the level of the first reference transmission leakage signal T1 (in step S117), the digital signal processor 321 proceeds to step S121.

In step S121, the digital signal processor 321 determines whether the loop iteration count L1 is smaller than a loop iteration threshold value K. If the loop iteration count L1 is smaller than the loop iteration threshold value K (in step S121), the digital signal processor 321 proceeds to step S123. In step S123, the digital signal processor 321 increases the loop iteration count L21 by '1'. Thereafter, the digital signal processor 321 returns to step S115. If the loop iteration count L1 is not smaller than the loop iteration threshold value K (in step S121), the digital signal processor 321 proceeds to step S125.

In step S125, the digital signal processor 321 stores the first leakage control signal N1 in an internal memory (e.g., an EPROM) and resets the loop iteration count L1 to the initial value (e.g., '0'). Thereafter, the digital signal processor 321 proceeds to step S127.

In step S127, the digital signal processor 321 determines whether to perform a single loop. If a single loop is to be performed (in step S127), the digital signal processor 321 ends the process. If a single loop is not to be performed (in step S127), the digital signal processor 321 proceeds to step S129. Herein, the single loop is to suppress a transmission leakage signal in order to suppress a leakage signal with respect to one of an internal signal and an external signal.

In step S129, the digital signal processor 321 detects a second transmission leakage signal J2.

In step S131, the digital signal processor 321 determines whether the level of the second transmission leakage signal J2 is equal to or lower than the level of a second reference transmission leakage signal T2. If the level of the second transmission leakage signal J2 is higher than the level of the second reference transmission leakage signal T2 (in step S131), the digital signal processor 321 proceeds to step S133. In step S133, the digital signal processor 321 changes a second leakage control signal N2. If the level of the second transmission leakage signal J2 is equal to or lower than the level of the second reference transmission leakage signal T2 (in step S131), the digital signal processor 321 proceeds to step S135.

In step S135, the digital signal processor 321 determines whether the loop iteration count L2 is smaller than a loop iteration threshold value M. If the loop iteration count L2 is smaller than the loop iteration threshold value M (in step S135), the digital signal processor 321 proceeds to step S137. In step S137, the digital signal processor 321 increases the loop iteration count L21 by '1'. Thereafter, the digital signal processor 321 returns to step S129. If the loop iteration count L2 is not smaller than the loop iteration threshold value M (in step S137), the digital signal processor 321 proceeds to step S139.

In step S139, the digital signal processor 321 stores the second leakage control signal N2 in an internal memory (e.g., an EPROM) and resets the loop iteration count L2 to the initial value (e.g., '0'). Thereafter, the digital signal processor 321 ends the process.

The first leakage control signal N1 and the second leakage control signal N2, stored in steps S125 and S139, may be used as initial values for controlling transmission leakage signals in an initial operation of the digital signal processor 321.

As described above, the use of the present invention makes it possible to suppress all of the internal/external transmission leakage signals, inputted together with the RX signal, through the two transmission leakage signal suppression loops.

As described above, the RFID reader according the present invention can effectively suppress two (internal/external) transmission leakage signals through two loops. Also, the RFID reader can increase the TX/RX isolation by suppressing the transmission leakage signals. Also, the RFID reader can increase the identification distance and the identification rate of an RFID system by increasing the TX/RX isolation.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Radio Frequency IDentification (RFID) reader comprising:
   a first power divider dividing a transmit (TX) signal to output a first TX signal and a second TX signal;
   a second power divider dividing the second TX signal to output a third TX signal and a fourth TX signal;
   a first loop receiving the first TX signal and suppressing a first transmission leakage signal of a receive (RX) signal in response to a first leakage control signal;
   a second loop receiving the third TX signal and suppressing a second transmission leakage signal of the RX signal, received through the first loop, in response to a second leakage control signal;
   a digital signal processor generating the first leakage control signal and the second leakage control signal,
   wherein the digital signal processor generates the first leakage control signal until the level of the first transmission leakage signal becomes equal to or lower than the level of a first reference transmission leakage signal; and
   a TX antenna receiving the fourth TX signal.

2. The RFID reader of claim 1, wherein if the level of the first transmission leakage signal is equal to or lower than the level of the first reference transmission leakage signal, the digital signal processor generates the second leakage control signal until the level of the second transmission leakage signal becomes equal to or lower than the level of a second reference transmission leakage signal.

3. The RFID reader of claim 2, wherein if the first loop suppresses an internal transmission leakage signal, the second loop suppresses an external transmission leakage signal.

4. The RFID reader of claim 3, wherein if the first loop suppresses an external transmission leakage signal, the second loop suppresses an internal transmission leakage signal.

5. The RFID reader of claim 4, wherein the second loop includes:
   a first amplitude/phase shifter shifting the amplitude/phase of the first TX signal according to the second leakage control signal to generate a second leakage suppression signal; and a first power combiner combining the RX signal, received through the first loop, with the second leakage suppression signal to suppress the second transmission leakage signal.

6. The RFID reader of claim 5, wherein the first loop includes:
 a second amplitude/phase shifter shifting the amplitude/phase of the third TX signal according to the first leakage control signal to generate a first leakage suppression signal; and
 a second power combiner combining the RX signal with the first leakage suppression signal to suppress the first transmission leakage signal.

7. The RFID reader of claim 6, wherein the digital signal processor sets initial values for generation of the first leakage control signal and the second leakage control signal, and generates the first leakage control signal and the second leakage control signal by means of the set initial values.

8. The RFID reader of claim 7, wherein the digital signal processor detects the first transmission leakage signal and the second transmission leakage signal, generates the first leakage control signal by means of the transmission leakage signal, and generates the second leakage control signal by means of the second transmission leakage signal.

9. The RFID reader of claim 8, wherein the digital signal processor generates the first leakage control signal by determining, iteratively a predetermined number of times, whether the first transmission leakage signal included in the RX signal has a smaller value than the first reference transmission leakage signal.

10. The RFID reader of claim 8, wherein the digital signal processor generates the second leakage control signal by determining, iteratively a predetermined number of times, whether the second transmission leakage signal included in the RX signal has a smaller value than the second reference transmission leakage signal.

11. A method for suppressing transmission leakage signals of a Radio Frequency IDentification (RFID) reader, comprising:
 dividing a transmit (TX) signal to generate a first TX signal and a second TX signal;
 dividing the second TX signal to generate a third TX signal and a fourth TX signal;
 controlling the amplitude/phase of the third TX signal in response to a first leakage control signal to generate a first leakage suppression signal;
 combining the first leakage suppression signal with the RX signal to suppress a first transmission leakage signal;
 controlling the amplitude/phase of the first TX signal in response to a second leakage control signal to generate a second leakage suppression signal; and
 combining the second leakage suppression signal with the RX signal to suppress a second transmission leakage signal,
 wherein the first leakage control signal is generated until the level of the first transmission leakage signal becomes equal to or lower than the level of a first reference transmission leakage signal.

12. The method of claim 11, wherein if the level of the first transmission leakage signal is equal to or lower than the level of the first reference transmission leakage signal, the second leakage control signal is generated until the level of the second transmission leakage signal becomes equal to or lower than the level of a second reference transmission leakage signal.

13. The method of claim 12, wherein if the first transmission leakage signal is an internal transmission leakage signal, the second transmission leakage signal is an external transmission leakage signal.

14. The method of claim 13, wherein if the first transmission leakage signal is an external transmission leakage signal, the second transmission leakage signal is an internal transmission leakage signal.

15. The method of claim 14, wherein the first leakage control signal and the second leakage control signal are generated using predetermined initial values.

16. The method of claim 15, wherein the first leakage control signal is generated by determining, iteratively a predetermined number of times, whether the first transmission leakage signal included in the RX signal has a smaller value than the first reference transmission leakage signal.

17. The method of claim 15, wherein the second leakage control signal is generated by determining, iteratively a predetermined number of times, whether the second transmission leakage signal included in the RX signal has a smaller value than the second reference transmission leakage signal.

18. The method of claim 11, wherein the TX signal is a continuous-wave signal that is transmitted in a period previous to a transmission period of a command of the RFID reader.

19. The method of claim 11, wherein the first leakage suppression signal is generated by controlling the third TX signal to have the same amplitude as the first transmission leakage signal and controlling the third TX signal to have the opposite phase with respect to the first transmission leakage signal.

20. The method of claim 11, wherein the second leakage suppression signal is generated by controlling the first TX signal to have the same amplitude as the second transmission leakage signal and controlling the first TX signal to have the opposite phase with respect to the second transmission leakage signal.

21. A Radio Frequency IDentification (RFID) reader comprising:
 a first power divider dividing a transmit (TX) signal to output a first TX signal and a second TX signal;
 a second power divider dividing the second TX signal to output a third TX signal and a fourth TX signal;
 a first loop receiving the first TX signal and suppressing a first transmission leakage signal of a receive (RX) signal in response to a first leakage control signal; and
 a second loop receiving the third TX signal and suppressing a second transmission leakage signal of the RX signal, received through the first loop, in response to a second leakage control signal;
 wherein the first loop includes:
 a second amplitude/phase shifter shifting the amplitude/phase of the third TX signal according to the first leakage control signal to generate a first leakage suppression signal; and
 a second power combiner combining the RX signal with the first leakage suppression signal to suppress the first transmission leakage signal, and
 wherein the second loop includes:
 a first amplitude/phase shifter shifting the amplitude/phase of the first TX signal according to the second leakage control signal to generate a second leakage suppression signal; and
 a first power combiner combining the RX signal, received through the first loop, with the second leakage suppression signal to suppress the second transmission leakage signal.

* * * * *